US012794931B2

(12) United States Patent
Stodden et al.

(10) Patent No.: US 12,794,931 B2
(45) Date of Patent: Nov. 10, 2026

(54) SYSTEM AND METHOD FOR DETECTION AND PREVENTION OF COMPUTING DEVICE INTRUSION VECTORS USING AI

(71) Applicant: BANK OF AMERICA CORPORATION, Charlotte, NC (US)

(72) Inventors: Chase Stodden, Belmont, NC (US); Michael R. Young, Davidson, NC (US); Ayush Anand, Singapore (SG); James J. Siekman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 84 days.

(21) Appl. No.: 18/801,904

(22) Filed: Aug. 13, 2024

(65) Prior Publication Data

US 2026/0052170 A1 Feb. 19, 2026

(51) Int. Cl.
*H04L 9/40* (2022.01)

(52) U.S. Cl.
CPC ...... *H04L 63/1441* (2013.01); *H04L 63/1416* (2013.01); *H04L 63/1425* (2013.01)

(58) Field of Classification Search
CPC ............. H04L 63/1441; H04L 63/1416; H04L 63/1425; H04L 9/40; H04L 51/12; G06F 21/55; G06F 21/56; G06N 3/08; G06N 20/00
See application file for complete search history.

(56) References Cited

U.S. PATENT DOCUMENTS

| | | | | |
|---|---|---|---|---|
| 8,566,938 | B1 * | 10/2013 | Prakash | H04L 51/212 726/22 |
| 2006/0015561 | A1 * | 1/2006 | Murphy | H04L 51/212 709/206 |
| 2013/0333026 | A1 * | 12/2013 | Starink | G06F 16/9558 726/22 |
| 2016/0344770 | A1 * | 11/2016 | Verma | H04L 51/42 |
| 2019/0005428 | A1 * | 1/2019 | Kras | G06Q 10/06314 |

* cited by examiner

*Primary Examiner* — Brian F Shaw
(74) *Attorney, Agent, or Firm* — Moore & Van Allen PLLC; Nicholas C. Russell

(57) ABSTRACT

Systems, computer program products, and methods are described herein for detection and prevention of computing device intrusion vectors. The system utilizes an AI engine that employs natural language processing (NLP) to analyze incoming communications in real-time, identifying deviations from expected patterns based on user-specific and entity-specific behaviors. The system compares these communications against learned behaviors to detect anomalies indicative of potential intrusion attempts. Upon identifying such anomalies, the system assigns a priority level to the potential intrusion and initiates remediation actions, such as blocking suspicious communications or generating alerts. Additionally, the system continuously updates its AI model based on detected anomalies to improve future detection accuracy and provides user-specific training to enhance the user's ability to recognize potential hazards. This adaptive approach offers robust protection against evolving intrusion vectors, minimizing manual intervention and enhancing overall device security.

14 Claims, 5 Drawing Sheets

SYSTEM AND METHOD FOR DETECTION AND PREVENTION OF COMPUTING DEVICE INTRUSION VECTORS USING AI

TECHNOLOGICAL FIELD

Example embodiments of the present disclosure relate to detection and prevention of computing device intrusion vectors.

BACKGROUND

In the digital era, computing devices are increasingly subject to malicious actors attempting to compromise device security through various intrusion vectors. These intrusion vectors may take many forms, including attacks, malicious links, and spoofed communications from seemingly trusted sources. Traditional methods of detecting and preventing such intrusions often rely heavily on user vigilance, requiring users to manually identify suspicious activities or communications. However, distinguishing between legitimate and malicious interactions can be challenging for users, particularly when intrusions are designed to closely mimic trusted sources. Consequently, there is a growing need for automated, intelligent solutions capable of accurately detecting and preventing computing device intrusions with minimal user intervention.

Applicant has identified a number of deficiencies and problems associated with detection and prevention of computing device intrusion vectors. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for detection and prevention of computing device intrusion vectors.

Systems, methods, and computer program products are provided for the detection and prevention of computing device intrusion vectors. The disclosed systems leverage advanced artificial intelligence (AI) models trained to recognize patterns in user and entity communications, enabling proactive identification of potential intrusion attempts. By analyzing communications—such as emails, messages, and other forms of digital correspondence—these AI models can detect deviations from established patterns or norms that may indicate malicious activity.

In some embodiments, the system includes an on-device AI engine configured to analyze incoming communications in real time. This AI engine utilizes natural language processing (NLP) techniques to assess various characteristics of the communication, such as writing style, formatting, and contextual relevance. For example, the AI engine can be trained to recognize a particular user's communication style and flag any significant deviations as potential intrusion attempts, such as when a message purportedly from a trusted contact contains unusual language or formatting.

Additionally, the system can be trained on entity-specific communication conventions, such as the standardized formats used by financial institutions or corporate entities. Any detected deviations from these conventions can trigger remediation actions, including blocking the communication, disabling suspicious hyperlinks, or generating alerts to warn the user of a potential threat.

Furthermore, the system can provide user-specific training modules tailored to the types of threats most relevant to each user. For instance, if the system determines that a user is frequently targeted by malicious attempts, it can generate educational content to help the user better recognize red flags in future communications.

By integrating these AI-driven detection and prevention mechanisms, the disclosed system offers a robust solution for mitigating the vulnerabilities associated with computing device intrusion vectors, thereby enhancing overall device security and user safety.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
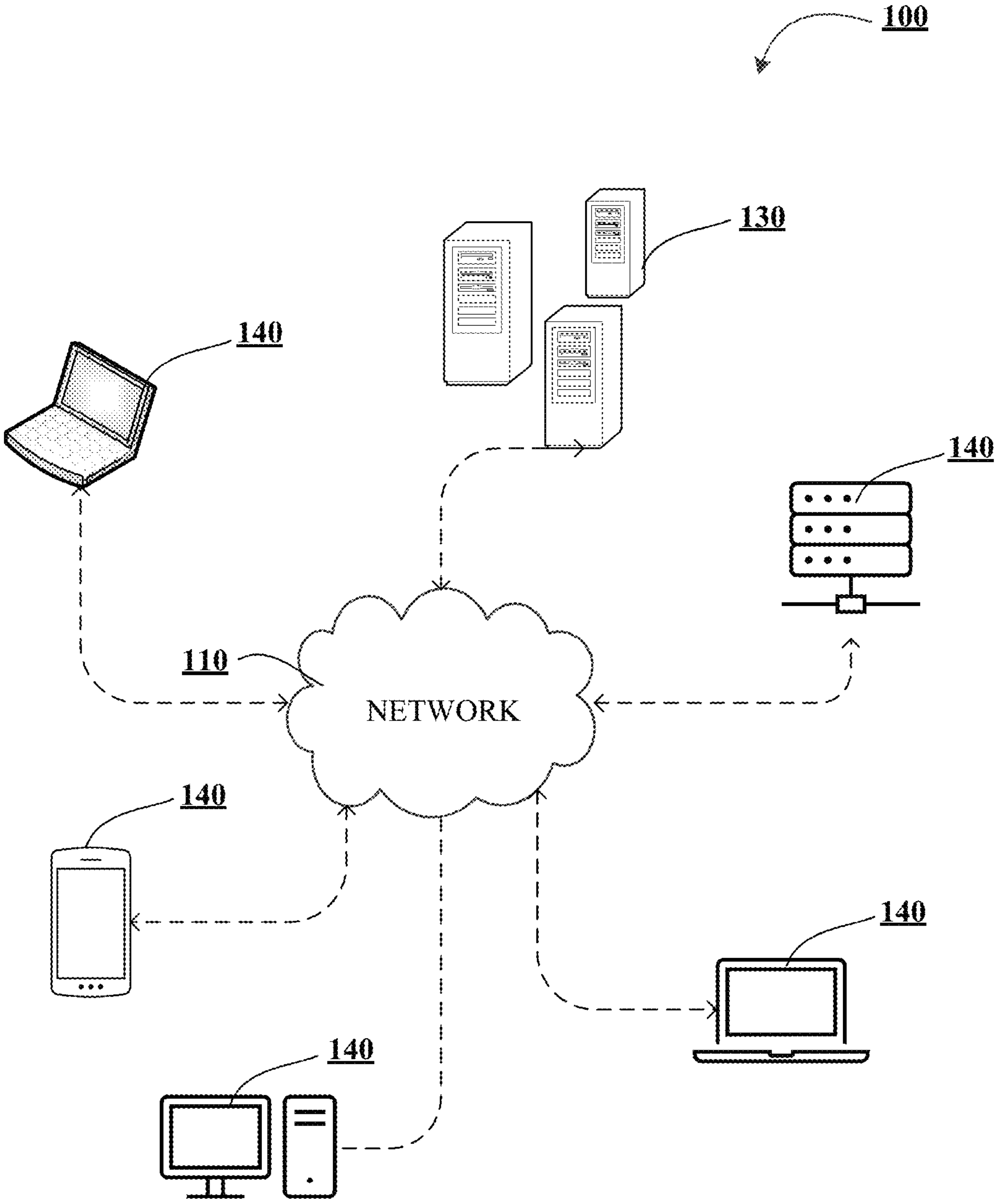
Figure 1B:
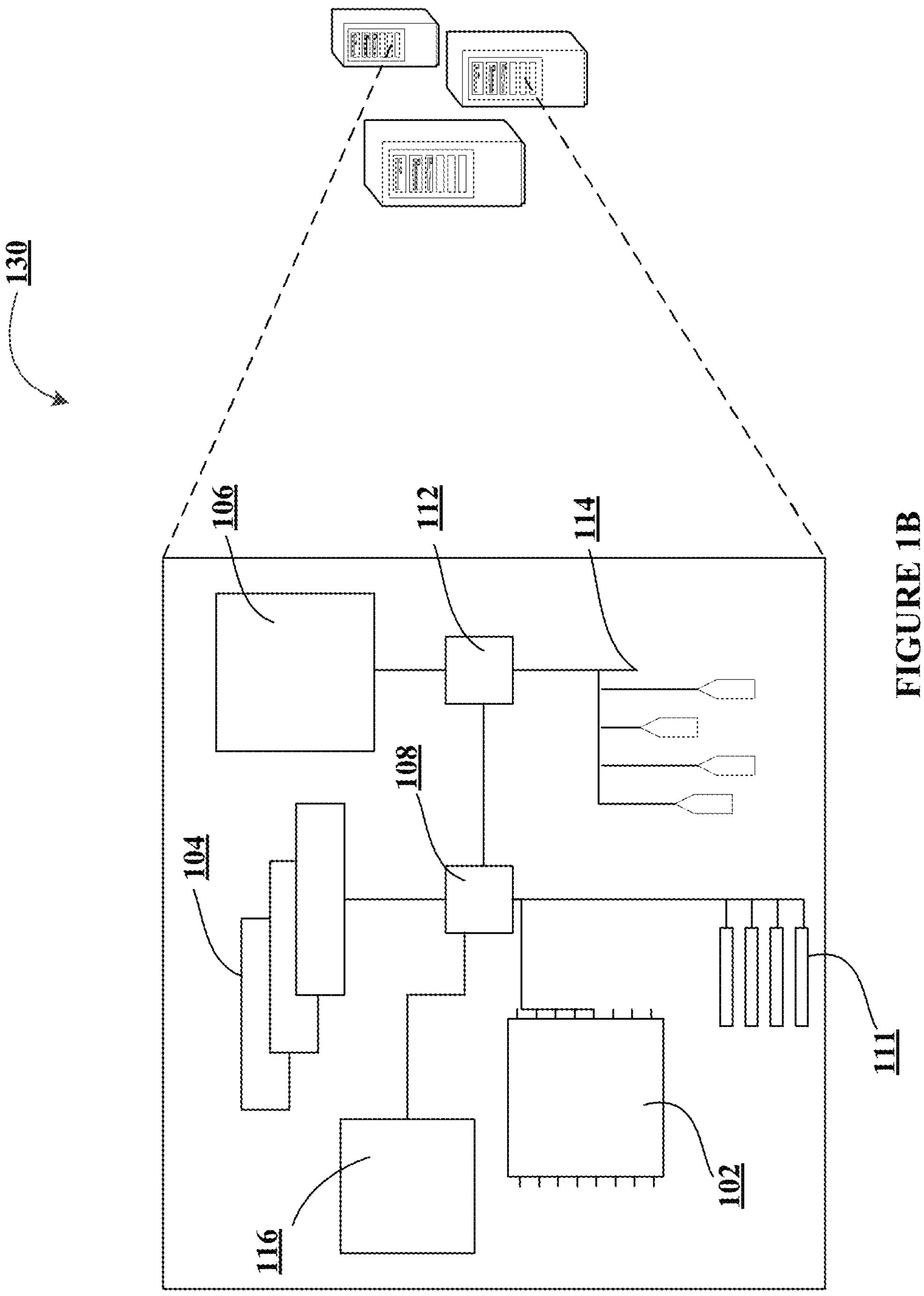
Figure 1C:
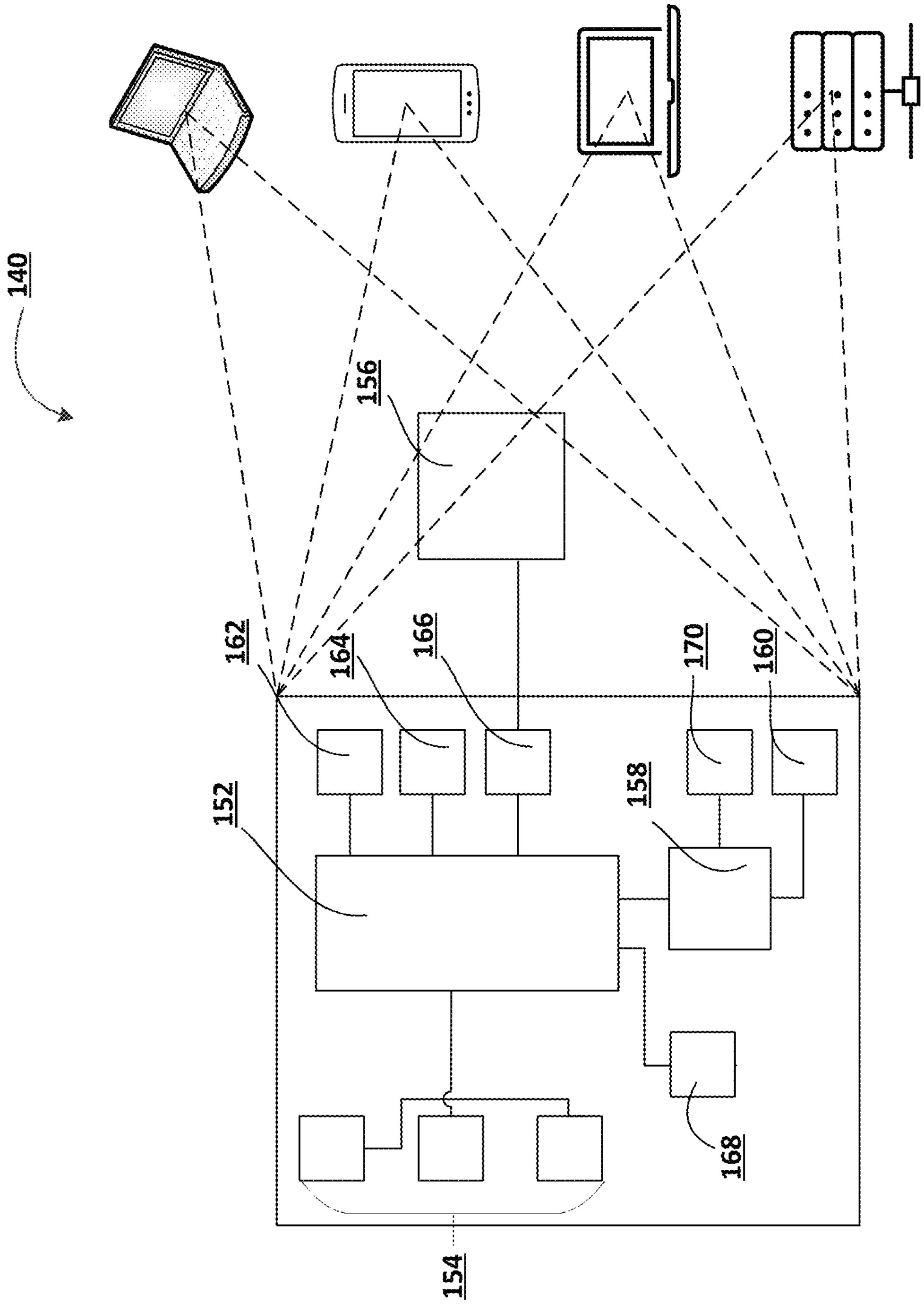
Figure 2:
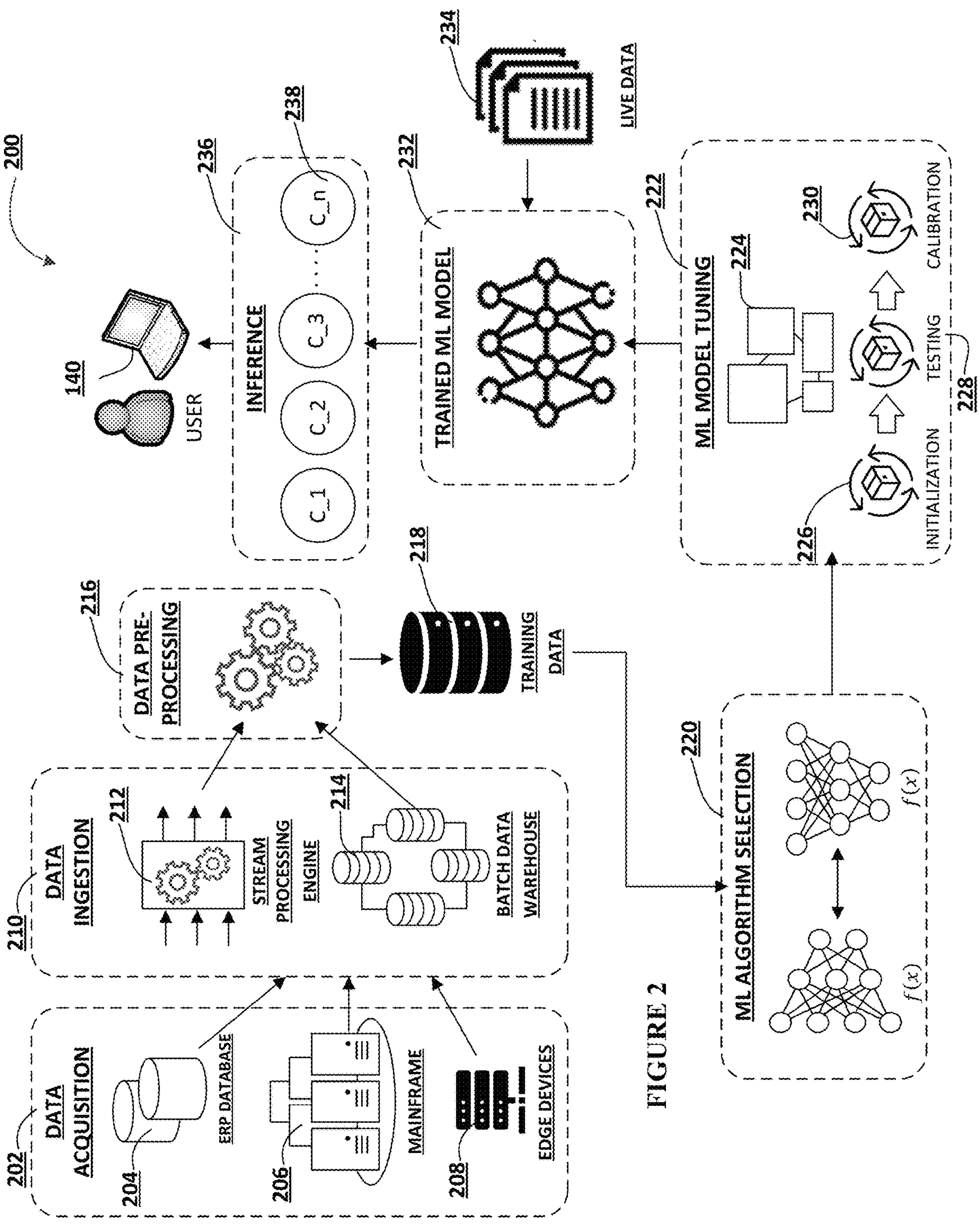
Figure 3:
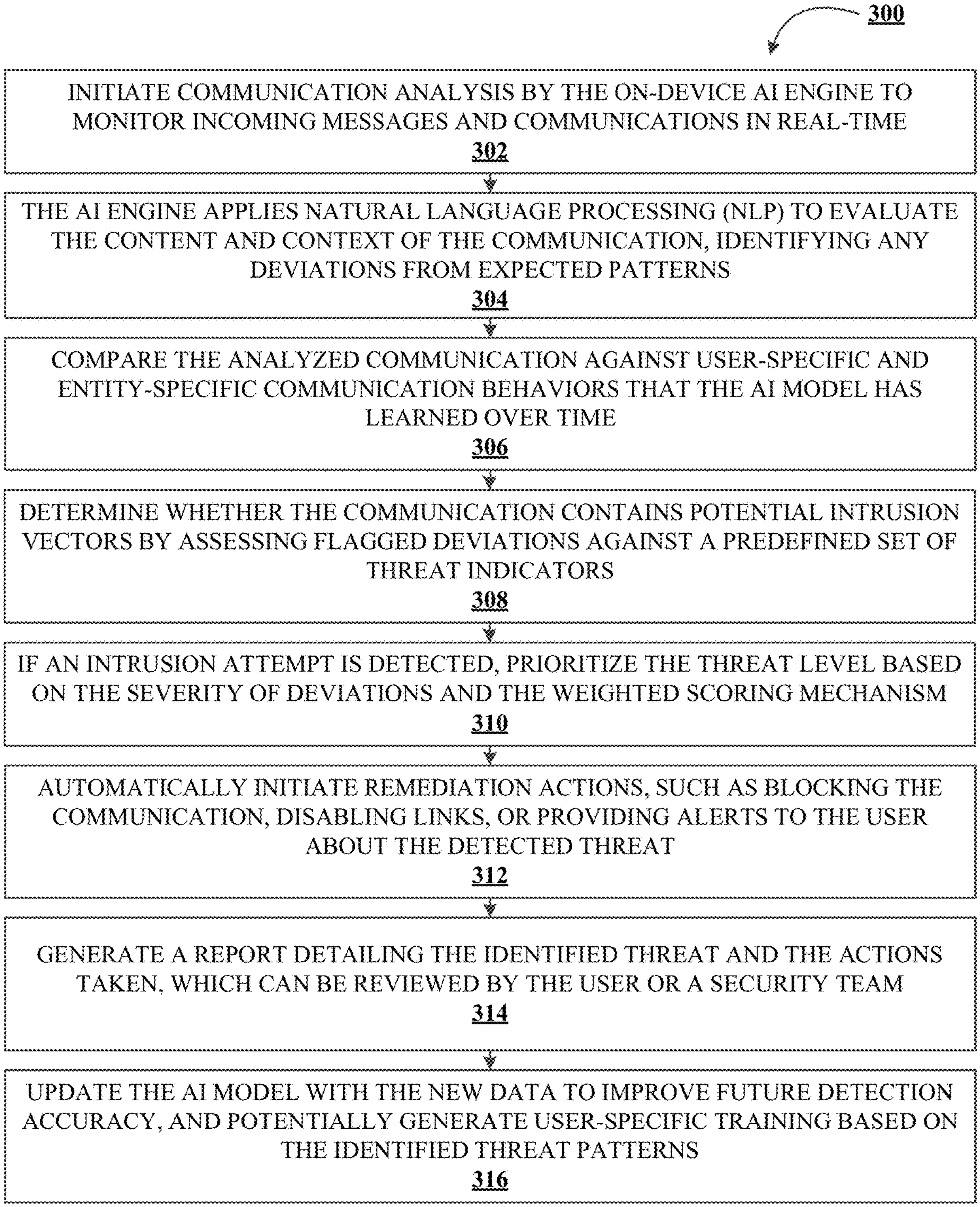

FIGS. 1A-1C illustrate technical components of an exemplary distributed computing environment for detection and prevention of computing device intrusion vectors, in accordance with an embodiment of the disclosure;

FIG. 2 illustrates an exemplary machine learning (ML) subsystem architecture 200, in accordance with an embodiment of the invention; and FIG. 3 illustrates a process flow for detection and prevention of computing device intrusion vectors, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present disclosure introduces an advanced AI-driven system designed for the detection and prevention of intrusion vectors targeting computing devices. This system leverages cutting-edge natural language processing (NLP) and machine learning techniques to enhance security measures against malicious activities.

Traditional methods for detecting and preventing intrusions often rely on user vigilance to identify suspicious activities, such as malicious attempts or spoofed communications. However, these methods are inherently flawed, as they require users to differentiate between legitimate and malicious communications-a task that can be exceptionally difficult when intrusions are designed to closely mimic trusted sources. As a result, there is a significant vulnerability of compromised security when users fail to recognize these threats.

The solution provided by the present disclosure is an AI-powered system that automatically detects and prevents intrusion attempts on computing devices. By analyzing patterns in communication—such as the style of writing or the format of an email—the system can identify when something seems off or unusual, such as when a message looks like it's from a friend or a bank but doesn't match their typical style. If something suspicious is found, the system can block the message, alert the user, or take other protective actions, all without requiring the user to spot the threat themselves.

Accordingly, the present disclosure describes a system that includes a trained AI model capable of recognizing potential intrusion attempts within communications. This system features an on-device AI engine that analyzes communications in real-time using natural language processing (NLP) to detect deviations from expected patterns. It is designed to learn and adapt to both user-specific and entity-specific communication behaviors. The system also incorporates various remediation mechanisms, such as blocking suspicious communications or providing alerts to the user, and includes user-specific training modules to help users recognize potential threats based on their communication habits and the types of attacks they are most likely to encounter.

What is more, the present disclosure provides a technical solution to a technical problem. The technical problem includes the difficulty in reliably detecting and preventing sophisticated intrusion attempts on computing devices, especially those designed to closely resemble legitimate communications. The technical solution presented herein allows for the automated identification and prevention of such intrusions by leveraging AI and machine learning to analyze communication patterns, thereby reducing the reliance on user intervention and enhancing overall security.

In particular, the AI-driven solution described herein is an improvement over existing intrusion detection methods, (i) by reducing the number of steps needed to detect and prevent intrusions, thus conserving computing resources such as processing power, storage, and network bandwidth, (ii) by providing a more accurate and consistent detection mechanism, thereby minimizing the likelihood of errors and reducing the resources required to address any false positives, (iii) by automating the detection process, eliminating the need for manual input, which enhances the speed and efficiency of the security measures, and (iv) by optimizing resource usage to ensure that the system operates efficiently without overloading network traffic or existing computing resources. Furthermore, the technical solution described herein employs a rigorous, computerized process to carry out specific tasks that were previously unachievable with traditional methods. In specific implementations, the solution bypasses unnecessary steps in the detection process, further conserving computing resources and improving overall system performance.

FIGS. 1A-1C illustrate technical components of an exemplary distributed computing environment 100 for detection and prevention of computing device intrusion vectors, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for detection and prevention of computing device intrusion vectors, in accordance with an embodiment of the disclosure. As shown in block 302, the process begins with the initiation of the on-device AI engine, which is responsible for monitoring all incoming communications in real-time. This constant vigilance allows the system to proactively assess every message, email, or other form of communication that enters the device, ensuring that no potential threat goes undetected. The AI engine is designed to operate seamlessly in the background, providing continuous protection without interrupting the user's regular activities. By beginning the analysis as soon as a communication is received, the system sets the stage for a comprehensive evaluation that will determine the legitimacy of the content and whether it poses any vulnerability to the device or the user. This initial step is crucial, as it allows the system to capture and scrutinize communications at the earliest possible moment, thereby enhancing the overall security posture of the device.

As shown in block 304, once the communication is captured, the AI engine proceeds to step 304, where it applies natural language processing (NLP) techniques to meticulously analyze the content and context of the message. NLP enables the system to parse the text, understand the semantics, and detect any linguistic anomalies that may signal a potential threat. This analysis goes beyond simple keyword detection, allowing the system to comprehend the intent and tone of the communication, which is particularly important in identifying sophisticated intrusion attempts that mimic legitimate interactions. By leveraging NLP, the AI engine can identify subtle cues, such as unusual phrasing, tone shifts, or unexpected language patterns, that might indicate a malicious attempt or other malicious activity. This deep linguistic analysis forms the backbone of the system's ability to differentiate between safe and potentially dangerous communications.

As shown in block 306, after the communication has been analyzed using NLP, the process moves to step 306, where the AI engine compares the analyzed data against a comprehensive database of user-specific and entity-specific communication behaviors. This database is built over time as the AI model learns from the patterns and nuances of how individual users and organizations typically communicate. By understanding these baseline behaviors, the system can more accurately identify when a communication deviates from the norm, which is often a telltale sign of an intrusion attempt. This step is critical because it allows the system to personalize its analysis, taking into account the unique communication styles and preferences of each user or entity. The ability to recognize these patterns enables the system to detect even minor anomalies that a less sophisticated approach might miss, thereby providing a higher level of security.

In step 308, the AI engine evaluates whether the detected deviations from expected communication patterns suggest the presence of an intrusion vector. This assessment is based on a predefined set of threat indicators that the system uses to measure the severity and potential vulnerability of the anomalies. If the deviations align with known characteristics of malicious activities, such as malicious or spoofing attempts, the system flags the communication as suspicious. The assessment also considers the context of the communication, including the sender, the content, and the potential impact of the intrusion if it were successful. By carefully weighing these factors, the system can prioritize the threat level and determine the appropriate course of action in subsequent steps. This decision-making process is essential for ensuring that the system not only detects potential threats but also responds to them in a manner that is proportionate to the vulnerability they pose.

As shown in block 310, upon identifying a communication as potentially malicious in step 308, the AI engine advances to step 310, where it assigns a priority level to the threat based on the severity of the detected deviations. This priority assessment is guided by a weighted scoring system that evaluates the nature and extent of the anomalies, with particular emphasis on those deviations that most closely match known intrusion vectors. For instance, a communication exhibiting multiple high-vulnerability indicators, such as altered sender information combined with unusual language patterns, would receive a higher threat score than one with minor deviations. This scoring mechanism allows the system to triage potential threats, ensuring that the most dangerous or suspicious communications are addressed promptly and effectively. By prioritizing threats in this manner, the system optimizes its response, focusing resources and attention where they are most needed to protect the user and the device.

As shown in block 312, once the threat has been prioritized, the system initiates appropriate remediation actions in step 312. Depending on the severity and nature of the threat, these actions may include blocking the communication entirely, disabling any hyperlinks or attachments within the message, or generating an alert to notify the user of the potential vulnerability. The system may also automatically quarantine the suspicious communication for further analysis or review by a security professional. These remediation measures are designed to neutralize the threat before it can cause harm, thereby safeguarding the device and its data from unauthorized access or damage. In cases where the threat is deemed particularly severe, the system might escalate the response by temporarily restricting certain device functionalities or initiating a security lockdown to prevent further intrusion attempts. This proactive approach to threat mitigation is crucial for maintaining the integrity and security of the user's digital environment.

As shown in block 314, after taking the necessary remediation actions, the system proceeds to step 314, where it generates a detailed report documenting the identified threat and the actions taken to address it. This report includes information such as the nature of the detected anomalies, the communication's content, the sender's details, and the specific remediation steps that were executed. The report serves as a valuable resource for both the user and any security personnel involved, providing insights into the nature of the threat and the system's response. Additionally, this documentation helps in tracking potential patterns of attack, enabling the system to refine its threat detection algorithms over time. By maintaining a comprehensive log of all security incidents, the system supports continuous improvement in its protective capabilities and contributes to a more robust security posture.

As shown in block 316, the final step in the process, step 316, involves updating the AI model with the new data collected during the threat detection and remediation process. This continuous learning mechanism allows the AI engine to improve its accuracy and effectiveness over time, adapting to new and evolving threats as they emerge. The system incorporates the insights gained from each incident, refining its understanding of what constitutes normal versus suspicious behavior in communications. Additionally, the AI engine may use this updated knowledge to enhance its user-specific training modules, providing tailored guidance on recognizing and responding to future threats. By constantly learning and adapting, the system ensures that it remains at the forefront of intrusion detection technology, offering users a dynamic and resilient defense against the ever-changing landscape of cybersecurity threats.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detection and prevention of computing device intrusion vectors, the system comprising:

a processing device;

a non-transitory storage device containing instructions when executed by the processing device, causes the processing device to perform the steps of:

monitoring, in real-time, incoming communications on the computing device;

analyzing the content and context of the communications using natural language processing (NLP) to identify deviations from expected communication patterns;

comparing the analyzed communication against learned user-specific and entity-specific behaviors to detect anomalies indicative of potential intrusion attempts;

determining, based on the detected anomalies, whether the communication constitutes a potential intrusion vector;

assigning a priority level to the potential intrusion vector based on the severity of the detected anomalies;

initiating a remediation action based on the assigned priority level to mitigate the threat posed by the potential intrusion vector, wherein the remediation action includes blocking the communication from being displayed to the user if it is determined to be a high-severity intrusion vector; and generating a user-specific training module based on the types of threats detected, tailored to enhance the user's ability to recognize future intrusion attempts.

2. The system of claim 1, wherein the system is further configured to: generate an alert to notify the user of the detected potential intrusion vector.

3. The system of claim 1, wherein the system is further configured to: disable hyperlinks or attachments within the communication that are identified as potentially malicious.

4. The system of claim 1, wherein the system is further configured to: quarantine the communication for further analysis before allowing any interaction with the user.

5. The system of claim 1, wherein the system is further configured to: update the AI model based on the detected anomalies and remediation actions to improve future threat detection accuracy.

6. A computer program product for detection and prevention of computing device intrusion vectors, the computer program product comprising a non-transitory computer-readable medium comprising code causing an apparatus to perform:

monitoring, in real-time, incoming communications on the computing device;

analyzing the content and context of the communications using natural language processing (NLP) to identify deviations from expected communication patterns;

comparing the analyzed communication against learned user-specific and entity-specific behaviors to detect anomalies indicative of potential intrusion attempts;

determining, based on the detected anomalies, whether the communication constitutes a potential intrusion vector;

assigning a priority level to the potential intrusion vector based on the severity of the detected anomalies;

initiating a remediation action based on the assigned priority level to mitigate the threat posed by the potential intrusion vector, wherein the remediation action includes blocking the communication from being displayed to the user if it is determined to be a high-severity intrusion vector; and generating a user-specific training module based on the types of threats detected, tailored to enhance the user's ability to recognize future intrusion attempts.

7. The computer program product of claim 6, wherein the code further causes the apparatus to: generate an alert to notify the user of the detected potential intrusion vector.

8. The computer program product of claim 6, wherein the code further causes the apparatus to: disable hyperlinks or attachments within the communication that are identified as potentially malicious.

9. The computer program product of claim 6, wherein the code further causes the apparatus to: quarantine the communication for further analysis before allowing any interaction with the user.

10. The computer program product of claim 6, wherein the code further causes the apparatus to: update the AI model based on the detected anomalies and remediation actions to improve future threat detection accuracy.

11. A method for detection and prevention of computing device intrusion vectors, the method comprising:

monitoring, in real-time, incoming communications on the computing device;

analyzing the content and context of the communications using natural language processing (NLP) to identify deviations from expected communication patterns;

comparing the analyzed communication against learned user-specific and entity-specific behaviors to detect anomalies indicative of potential intrusion attempts;

determining, based on the detected anomalies, whether the communication constitutes a potential intrusion vector;

assigning a priority level to the potential intrusion vector based on the severity of the detected anomalies;

initiating a remediation action based on the assigned priority level to mitigate the threat posed by the potential intrusion vector, wherein the remediation action includes blocking the communication from being displayed to the user if it is determined to be a high-severity intrusion vector; and generating a user-specific training module based on the types of threats detected, tailored to enhance the user's ability to recognize future intrusion attempts.

12. The method of claim 11, wherein the method further comprises: generate an alert to notify the user of the detected potential intrusion vector.

13. The method of claim 11, wherein the method further comprises: disable hyperlinks or attachments within the communication that are identified as potentially malicious.

14. The method of claim 11, wherein the method further comprises: quarantine the communication for further analysis before allowing any interaction with the user.

* * * * *